(12) United States Patent
Parthasarathy et al.

(10) Patent No.: US 6,251,815 B1
(45) Date of Patent: Jun. 26, 2001

(54) THERMAL GRADIENT RESISTANT CERAMIC COMPOSITE

(75) Inventors: Triplicane A. Parthasarathy, Beavercreek; Ronald J. Kerans, Yellow Springs, both of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/483,924

(22) Filed: Jan. 18, 2000

(51) Int. Cl.$^7$ .................................................. C04B 35/80
(52) U.S. Cl. .................. 501/95.2; 501/127; 501/128; 428/293.4; 428/364
(58) Field of Search ................... 501/95.2, 127, 501/128; 428/293.4, 364

(56) References Cited

U.S. PATENT DOCUMENTS

| 5,158,828 | * | 10/1992 | Sudani et al. | 501/95.2 |
| 5,159,152 | * | 10/1992 | Dawes et al. | 501/95.2 |
| 5,945,166 | | 8/1999 | Singh et al. | 427/376.2 |

* cited by examiner

*Primary Examiner*—Karl Group
(74) *Attorney, Agent, or Firm*—Charles E. Bricker; Thomas L. Kundert

(57) ABSTRACT

A thermal gradient resistant fiber-reinforced composite structure which has a hot operating side and an opposite cool operating side and a thickness $\tau$ therebetween. In one embodiment, the composite has two regions: hot and cool. The hot region consists essentially of a fiber having a first coefficient of thermal expansion and a matrix material and the cool region consists essentially of a fiber having a second coefficient of thermal expansion and a matrix material. In this embodiment, the hot region has a thickness $\tau_H$ of about 10 to 90 percent of the total thickness $\tau$ between the hot side and the cool side, and the cool region has a thickness $\tau_C$ of about 90 to 10 percent of the total thickness $\tau$. In a second embodiment, the composite has a hot operating side and an opposite cool operating side and a thickness $\tau'$ therebetween. In this embodiment, the composite has three regions: hot, intermediate and cool. The hot region consists essentially of a fiber having a first coefficient of thermal expansion and a matrix material and has a thickness $\tau_H'$ of about 10 to 45 percent of the total thickness $\tau'$ between the hot side and the cool side, the cool region consists essentially of a fiber having a second coefficient of thermal expansion and a matrix material and has a thickness $\tau_C'$ of about 45 to 10 percent of the total thickness $\tau'$, and the intermediate region consists essentially of a fiber having a third coefficient of thermal expansion and a matrix material and has a thickness $\tau_1$ of about 10 to 50 percent of the total thickness $\tau'$ between the hot side and the cool side. The intermediate region can also consist of a mixture of the two fibers used in the outer regions.

14 Claims, 2 Drawing Sheets

THERMAL GRADIENT RESISTANT CERAMIC COMPOSITE

RIGHTS OF THE GOVERNMENT

The invention described herein may be manufactured and used by or for the Government of the United States for all governmental purposes without the payment of any royalty.

BACKGROUND OF THE INVENTION

The present invention relates to fiber-reinforced composites. More particularly, the present invention relates to fiber-reinforced composites having a gradient in thermal expansion coefficient across at least one dimension of the component.

Fiber reinforced ceramic matrix composites having high temperature applications requiring thermal and environmental stability and good thermal shock resistance are increasingly used for combustion and exhaust components in jet and rocket engines, ceramic burner inserts, heat exchanger tubes, and the like.

The combustion and exhaust components, in order to serve their intended purpose, have to be operated at high temperatures and under mechanical and thermal stresses. In some cases, thermal stresses result from a temperature gradient through the thickness of the composite when one surface of the composite, serving as the component, sees a much high temperature than the other surface. The hot side of the component may be in compression and would benefit from reduced thermal expansion. The cold surface of the component may be in tension and would benefit from higher thermal expansion. It has been observed that prior art fiber-reinforced ceramic matrices often microcracked due to these stresses, thereby leading to the failure of these composites used as combustion and exhaust components.

Continuous oxide fibers such as Nextel 610 and Nextel 720, both available from 3M Company, Minneapolis Minn., have been used in porous matrices of alumina and silica to achieve damage-tolerant, high temperature composite materials for use in oxidizing conditions. Oxide-oxide composites are more resistant to environmental effects, such as oxygen, water and salts, than are non-oxide composites, e.g., SiC- or $Si_3N_4$-based composites. However, oxide-oxide composites typically have higher thermal expansion coefficients and lower thermal conductivity than, for example, SiC. The thermal conductivity is further lowered by the porosity levels that are often employed in the matrices of such composites to ensure damage tolerance. In applications such as combustion liners and engine nozzles, the large thermal gradients and the high thermal expansion result in the development of large stresses. Any reduction in these thermal stresses will greatly enhance the durability and applicability, permitting wider use of these composites.

Other fiber-matrix composites, such as carbon-carbon composites as well as SiC- or $Si_3N_4$-based composites, may also exhibit this gradient in thermal expansion coefficient across the thickness of the component when employed in high temperature applications.

Accordingly, it is an object of the present invention to provide improved fiber-matrix composites for use in high temperature applications which impose large thermal gradients.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a thermal gradient resistant fiber-reinforced composite structure. In a first embodiment, the composite of this invention has a hot operating side and an opposite cool operating side and a thickness $\tau$ therebetween. In this embodiment, the composite has two regions: hot and cool. The hot region consists essentially of a fiber having a first coefficient of thermal expansion and a matrix material and the cool region consists essentially of a fiber having a second coefficient of thermal expansion and a matrix material. In this embodiment, the hot region has a thickness $\tau_H$ of about 10 to 90 percent of the total thickness $\tau$ between the hot side and the cool side, and the cool region has a thickness $\tau_C$ of about 90 to 10 percent of the total thickness $\tau$.

In a second embodiment, the composite of this invention has a hot operating side and an opposite cool operating side and a thickness $\tau'$ therebetween. In this embodiment, the composite has three regions: hot, intermediate and cool. The hot region consists essentially of a fiber having a first coefficient of thermal expansion and a matrix material and has a thickness $\tau_H'$ of about 10 to 45 percent of the total thickness $\tau'$ between the hot side and the cool side, the cool region consists essentially of a fiber having a second coefficient of thermal expansion and a matrix material and has a thickness $\tau_C'$ of about 45 to 10 percent of the total thickness $\tau'$, and the intermediate region consists essentially of a fiber having a third coefficient of thermal expansion and a matrix material and has a thickness $\tau_1$ of about 10 to 50 percent of the total thickness $\tau'$ between the hot side and the cool side. The intermediate region can also consist of a mixture of the two fibers used in the outer regions.

DETAILED DESCRIPTION OF THE INVENTION

The present invention provides improved fiber-reinforced composites which are resistant to imposed thermal gradient during service. These composites have been fabricated using a variety of fibers, matrix materials and methods, which are known to those skilled in the art. The fibers used include, but are not limited to alumina, mullite, garnets, chromia, spinel, silicon carbide, boron nitride, carbon, zircon, silicon nitride, boron carbide, and the like.

Of particular interest are the fiber-reinforced ceramic structures. Any ceramic material may be used in the process of the invention. Thus, the ceramic material may be an oxide or a mixture of oxides of a metallic or of a non-metallic element, for example, an oxide of aluminium, calcium, magnesium, silicon, chromium, hafnium, molybdenum, thorium, uranium, titanium or zirconium. The ceramic material may be a carbide of, for example, boron, chromium, hafnium, molybdenum, niobium, tantalum, thorium, titanium, tungsten, uranium, zirconium or vanadium. The ceramic material may be silicon carbide. The ceramic material may be a boride or a nitride, for example, a boride or a nitride of one or more of the elements hereinbefore referred to.

A variety of methods have been employed for producing fiber-reinforced ceramic composites. For example, a three dimensional structure formed of fibers of a ceramic material, e.g. a structure formed of a mat or of a stack of a plurality of mats of fibers of a ceramic material, may be impregnated with a composition of particulate ceramic material, liquid diluent, and organic binder, and the thus impregnated structure may be further processed by heating to an elevated temperature, e.g. to a temperature in excess of 1000° C., to cause the particles of the material to sinter together. Alternatively, a dry mixture of particulate ceramic material and reinforcing fiber, in the form of whiskers, tow, woven tow, or the like, can be assembled and consolidated to fabricate a composite.

Figure 1:
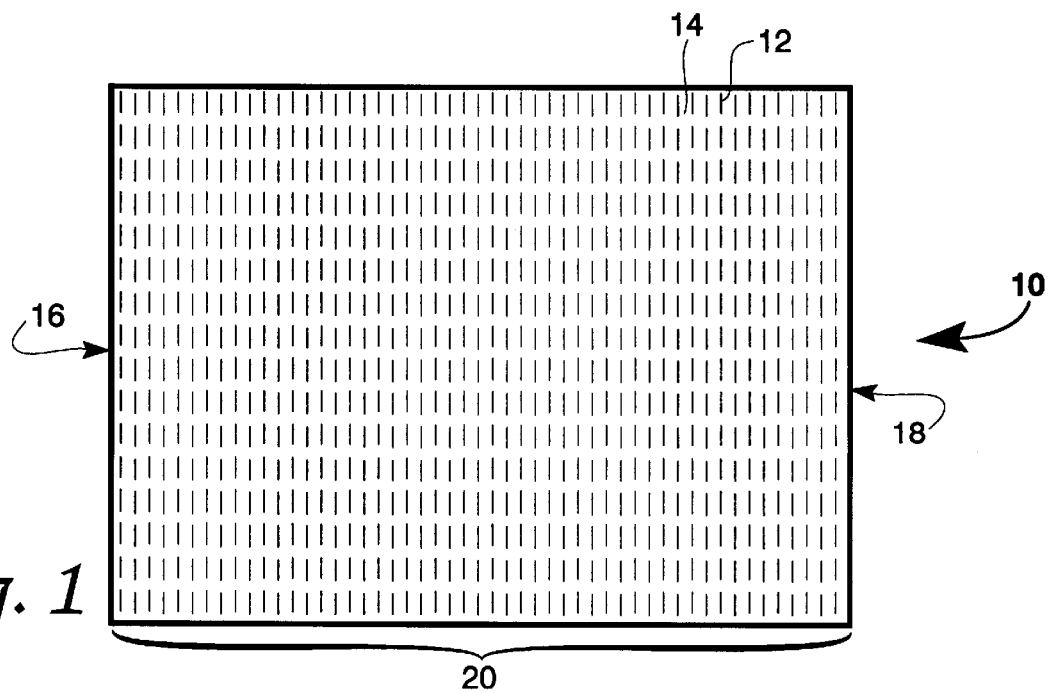
FIG. 1 is a representational view of a fiber-reinforced composite structure at a stress-free temperature.

Referring now to the drawings, FIG. 1 illustrates a fiber-reinforced composite material, designated generally by the numeral 10, at ambient temperature. Composite 10 comprises a plurality of reinforcing fibers 12 embedded in a matrix 14. Composite 10 has a hot operating side 16, a cool operating side 18, and a thickness 20 therebetween. Those skilled in the art will recognize that the terms hot and cool, as applied to the operating sides, are relative terms indicating that a temperature differential exists between the two sides and do not imply that the temperature is uniform within the region. Inasmuch as these structures are intended for use in high temperature environments, this temperature differential is on the order of 100° C. or greater.

Figure 2:
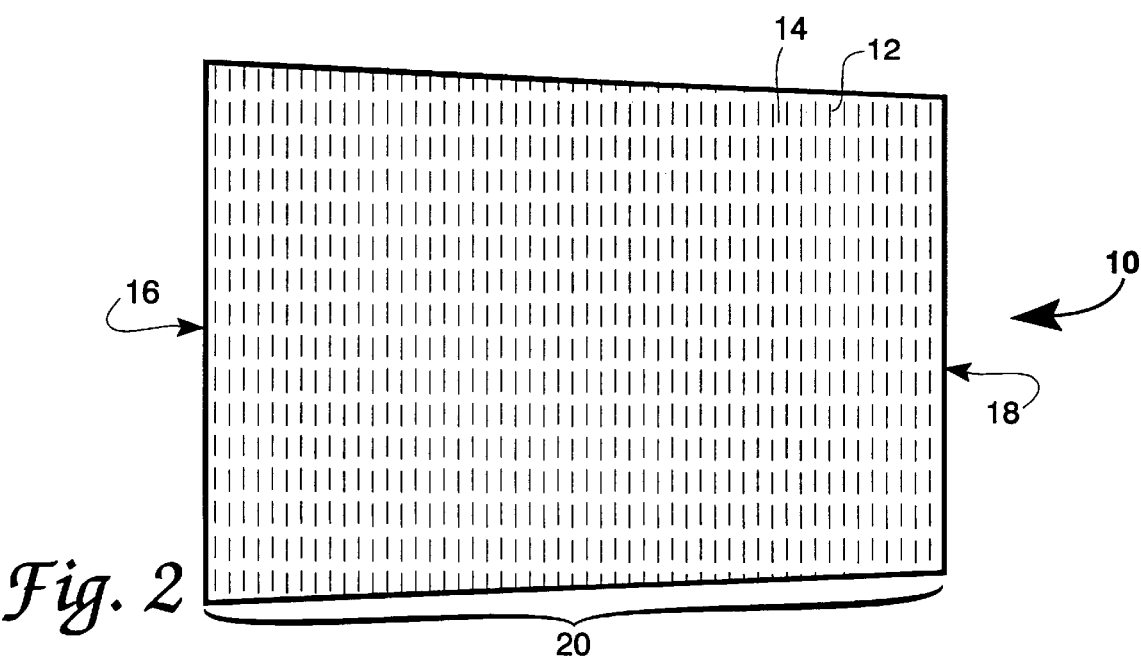
FIG. 2 is a representational view of the fiber-reinforced composite structure of FIG. 1 at an elevated temperature.

FIG. 2 illustrates the fiber-reinforced composite material of FIG. 1 at an elevated temperature. In FIG. 2, the heat applied to hot operating side 16 is greater than the heat applied to the cool operating side 18, thus establishing a temperature differential therebetween. Consequently, the composite structure distorts, due, at least in part, to thermal expansion of the reinforcing fibers.

Figure 3:
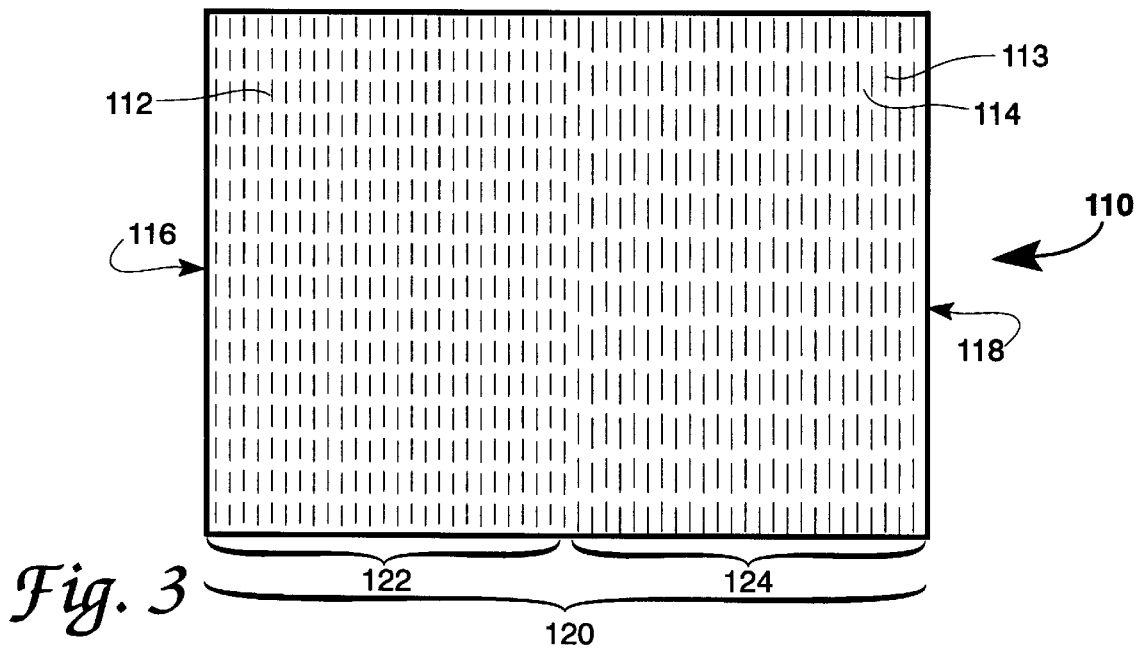
FIG. 3 is a representational view of one embodiment of the fiber-reinforced composite structure of the present invention.

FIG. 3 illustrates one embodiment of the fiber-reinforced composite structure of the present invention. This structure, designated 110, comprises a plurality of first reinforcing fibers 112 and a plurality of second reinforcing fibers 113 embedded in a matrix 114. Composite 110 has a hot operating side 116, a cool operating side 118, and a thickness 120 therebetween. Composite 110 has two regions, a hot region, designated 122, and a cool region, designated 124. Hot region 122 extends generally from hot operating side 116 toward cool operating side 118. Similarly, cool region 124 extends from cool operating side 118 toward hot operating side 116. Hot region 122 consists essentially of fiber 112, which has a first coefficient of thermal expansion, and a matrix material 114. Cool region 124 consists essentially of fiber 113, which has a second coefficient of thermal expansion, and a matrix material 114.

Figure 4:
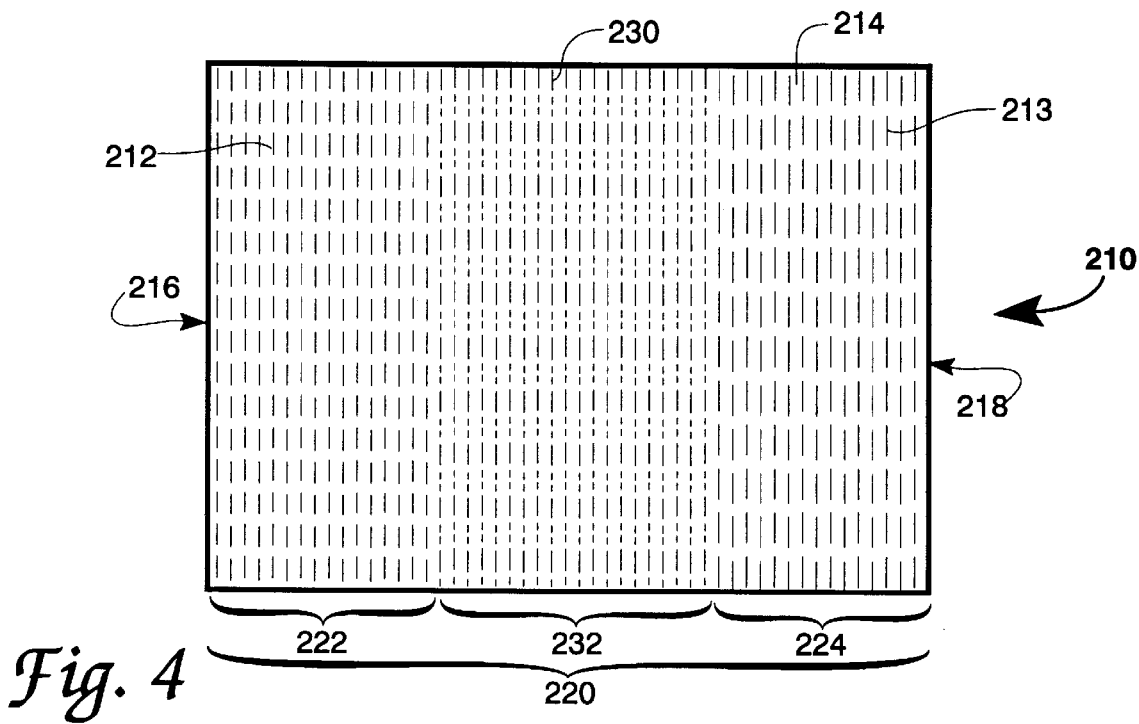
FIG. 4 is a representational view of another embodiment of the fiber-reinforced composite structure of the present invention.

FIG. 4 illustrates another embodiment of the fiber-reinforced composite structure of the present invention. This structure, designated 210, comprises a plurality of first reinforcing fibers 212, a plurality of second reinforcing fibers 213 and a plurality of third reinforcing fibers 230 embedded in a matrix 214. Composite 210 has a hot operating side 216, a cool operating side 218, and a thickness 220 therebetween. Composite 210 has three regions, a hot region, designated 222, a cool region, designated 224, and an intermediate region, designated 232, between the hot region 222 and the cool region 224. Hot region 222 extends generally from hot operating side 216 toward cool operating side 218. Similarly, cool region 224 extends from cool operating side 218 toward hot operating side 216. Hot region 222 consists essentially of fiber 212, which has a first coefficient of thermal expansion, and a matrix material 214. Cool region 224 consists essentially of fiber 213, which has a second coefficient of thermal expansion, and a matrix material 214. Intermediate region 232 consists essentially of fiber 230, which has a third coefficient of thermal expansion, and a matrix material 214.

An essential feature of the present invention is that fibers having different coefficients of thermal expansion be used in selected regions of the composite structure. The previously mentioned Nextel fibers have, for example, thermal expansions of 5.3 ppm/° C. for Nextel 550, 7.9 ppm/° C. for Nextel 610 and 6.0 ppm/° C. for Nextel 720. Thus, referring again to FIG. 3, Nextel 720 could be used as fiber 112 and Nextel 610 could be used for fiber 113.

Depending on the technique employed to fabricate the fiber-reinforced composite structure, the operating or use temperature of the composite, i.e., the hot operating side of the composite, will be greater than or less than the stress-free temperature of the composite. The thrust of the invention is to arrange the different fiber types such that stresses arising from differences in their thermal expansivity are opposite the stresses imposed by differences in temperature during application. Hence, the fibers with the highest expansion will go in the region of the composite that is nearest in temperature to the Minimum-Stress (uniform) Temperature (MST). Minimum-Stress (uniform) Temperature is defined as the uniform temperature at which the constrained part (that is, fastened into place for use) will have the lowest internal stresses. Parts that are used below the MST will have the higher-expansion fibers in the hotter region and parts used above the MST will have the higher expansion fibers in the cooler region. Thus, in one embodiment of the invention, when the use temperature is greater than the stress-free temperature, the fiber in the hot region should have a lower coefficient of thermal expansion than the fiber in the cool region. Accordingly, referring again to FIG. 3, fiber 112 in hot region 122 should have a lower coefficient of thermal expansion than fiber 113 in cool region 124, and with reference to FIG. 4, fiber 212 in hot region 222 should have a lower coefficient of thermal expansion than fiber 213 in cool region 224, and fiber 230 should have a coefficient of thermal expansion between that of fiber 212 and fiber 213.

In another embodiment of the invention, when the use temperature is less than the stress-free temperature, the fiber in the hot region should have a higher coefficient of thermal expansion than the fiber in the cool region. Accordingly, referring again to FIG. 3, fiber 112 in hot region 122 should have a higher coefficient of thermal expansion than fiber 113 in cool region 124, and with reference to FIG. 4, fiber 212 in hot region 222 should have a higher coefficient of thermal expansion than fiber 213 in cool region 224, and fiber 230 should have a coefficient of thermal expansion between that of fiber 212 and fiber 213.

In a presently preferred embodiment, the matrix material is alumina and the reforcing fibers are alumina. In another presently preferred embodiment, with reference to FIG. 3, the thickness of the hot region 122 is about 40 to 60% of total thickness 120, and the thickness of the cool region 124 is equal to total thickness 120 less thickness 122. In yet another presently preferred embodiment, with reference to FIG. 4, the thickness of the hot region 222 is about 20 to 40% of total thickness 220, and the thickness of the cool region 224 is about 20 to 40% of total thickness 220, and the thickness of intermediate region 232 is equal to total thickness 220 less the sum of thickness 222 and thickness 224. It is also within the scope of the present invention to employ reinforcing fibers of different types, as well as different matrix materials, in the operating regions of the composite structure of this invention.

It is further within the scope of the present invention to fabricate a composite having a gradient in coefficient of thermal expansion by using graded volume fractions of two fibers. For example, a composite of thickness $\tau$ could be divided into a plurality of regions, with the hot operating region receiving a first fiber having a first coefficient of thermal expansion, the cool operating region receiving a second fiber having a second coefficient of thermal expansion, a first region immediately adjacent the hot operating region receiving a mixture of fibers of first and second coefficients of thermal expansion, such as, for example, alumina and mullite in a ratio of 90:10, the next adjacent region receiving a second mixture, e.g., 80:20, and so on, until the region immediately adjacent the cool operating region receives a mixture of 10:90.

Having thus described exemplary embodiments of the present invention, it should be noted by those skilled in the art that the disclosures herein are exemplary only and that alternatives, adaptations and modifications may be made within the scope of the present invention.

We claim:

1. A thermal gradient resistant fiber-reinforced composite structure having a hot operating side and an opposite cool operating side and a thickness $\tau$ therebetween, said composite having a hot region and a cool region, wherein said hot region consists essentially of a first reinforcing fiber having a first coefficient of thermal expansion and a matrix material and wherein said hot region has a thickness $\tau_H$ which extends a portion of said thickness $\tau$ from said hot operating side toward said cool operating side, wherein said cool region consists essentially of a second reinforcing fiber having a second coefficient of thermal expansion and a matrix material and wherein said cool operating region has a thickness $\tau_C$ equal to said thickness $\tau$ minus thickness $\tau_H$.

2. The composite structure of claim 1 wherein said hot region has a thickness $\tau_H$ of about 10 to 90 percent of said total thickness $\tau$ said cool region has a thickness $\tau_C$ of about 90 to 10 percent of said total thickness $\tau$.

3. The composite structure of claim 2 wherein thickness $\tau_H$ is about 40 to 60 percent of said total thickness $\tau$ and thickness $\tau_C$ is about 40 to 60 percent of said total thickness $\tau$.

4. The composite structure of claim 1 wherein said matrix material is alumina and said first and second (reinforcing fibers are alumina.

5. The composite structure of claim 1 wherein the coefficient of thermal expansion of said fiber in said hot region is lower than the coefficient of thermal expansion of said fiber in said cool region.

6. The composite structure of claim 1 wherein the coefficient of thermal expansion of said fiber in said hot region is higher than the coefficient of thermal expansion of said fiber in said cool region.

7. A thermal gradient resistant fiber-reinforced composite structure having a hot operating side and an opposite cool operating side and a thickness $\tau'$ therebetween, said composite having a hot region, a cool region, and an intermediate region, wherein said hot region consists essentially of a first reinforcing fiber having a first coefficient of thermal expansion and a matrix material and wherein said hot region has a thickness $\tau_H'$ which extends a portion of said thickness $\tau'$ from said hot operating side toward said cool operating side, wherein said cool region consists essentially of a second reinforcing fiber having a second coefficient of thermal expansion and a matrix material and wherein said cool operating region has a thickness $\tau_C'$ which extends a portion of said thickness $\tau'$ from said cool operating side toward said hot operating side and wherein said intermediate region consists essentially of a third reinforcing fiber having a third coefficient of thermal expansion and a matrix material and wherein said intermediate region is positioned between said hot region and said cool region and has a thickness $\tau_I'$ equal to the total thickness $\tau'$ minus the sum of $\tau_H'$ and $\tau_C'$.

8. The composite structure of claim 7 wherein said hot region has a thickness $\tau_H'$ of about 10 to 45 percent of said total thickness $\tau$, and said cool region has a thickness $\tau_C'$ of about 45 to 10 percent of said total thickness $\tau$.

9. The composite structure of claim 7 wherein said hot region has a thickness $\tau_H'$ of about 20 to 40 percent of said total thickness $\tau$, and said cool region has a thickness $\tau_C'$ of about 20 to 40 percent of said total thickness $\tau$.

10. The composite structure of claim 7 wherein said matrix material is alumina and said first, second and third reinforcing fibers are alumina.

11. The composite structure of claim 7 wherein the coefficient of thermal expansion of said fiber in said hot region is lower than the coefficient of thermal expansion of said fiber in said cool region and wherein the coefficient of thermal expansion of said fiber in said intermediate region is lower than the coefficient of thermal expansion of said fiber in said cool region and higher than the coefficient of thermal expansion of said fiber in said hot region.

12. The composite structure of claim 7 wherein the coefficient of thermal expansion of said fiber in said hot region is higher than the coefficient of thermal expansion of said fiber in said cool region and wherein the coefficient of thermal expansion of said fiber in said intermediate region is higher than the coefficient of thermal expansion of said fiber in said cool region and lower than the coefficient of thermal expansion of said fiber in said hot region.

13. A thermal gradient resistant fiber-reinforced composite structure having a hot operating side and an opposite cool operating side and a thickness $\tau'$ therebetween, said composite having a hot region, a cool region, and an intermediate region, wherein said hot region consists essentially of a first fiber having a first coefficient of thermal expansion and a matrix material and wherein said hot region has a thickness $\tau_H'$ which extends a portion of said thickness $\tau'$ from said hot operating side toward said cool operating side, wherein said cool region consists essentially of a second fiber having a second coefficient of thermal expansion and a matrix material and wherein said cool operating region has a thickness $\tau_C'$ which extends a portion of said thickness $\tau'$ from said cool operating side toward said hot operating side and wherein said intermediate region is positioned between said hot region and said cool region and has a thickness $\tau_I'$ equal to the total thickness $\tau'$ minus the sum of $\tau_H'$ and $\tau_C'$, and consists essentially of a mixture of said first and second fibers, wherein the volume ratio of first to second fibers is varied across said intermediate region, wherein the volume portion of said first fibers is highest in the portion of said intermediate region adjacent said hot region and lowest in the portion of said intermediate region adjacent said cool region, and wherein the volume portion of said second fibers is highest in the portion of said intermediate region adjacent said cool region and lowest in the portion of said intermediate region adjacent said hot region.

14. The composite structure of claim 13 wherein said first fibers are alumina and said second fibers are mullite.

* * * * *